Nov. 30, 1948.  E. N. DINGLEY, JR  2,454,783
RADIO DIRECTION FINDER
Filed Dec. 2, 1936

INVENTOR
EDWARD N. DINGLEY JR.
BY
ATTORNEY

Patented Nov. 30, 1948

2,454,783

UNITED STATES PATENT OFFICE 2,454,783

RADIO DIRECTION FINDER

Edward N. Dingley, Jr., Arlington, Va.

Application December 2, 1936, Serial No. 113,794

4 Claims. (Cl. 343—116)

(Granted under the act of March 3, 1883, as amended April 30, 1928; 370 O. G. 757)

My invention relates broadly to radio direction finder systems by means of which the direction of arrival of radio waves may be determined accurately.

My invention relates chiefly to circuit arrangements in which the phase difference between the voltages induced in two spaced radio-wave collector systems is indicated either visually or aurally.

One of the objects of my invention is to provide a radio direction finder system by means of which the direction of arrival of radio waves may be determined regardless of the polarization of such waves and regardless of the vertical angle of incidence of such waves.

Another object of my invention is to provide means by which the phase difference of the voltages induced in two spaced radio-wave collector systems is indicated either visually or aurally thus making it possible to reposition the collector systems to points such that the phase difference between their output voltages is zero under which condition a line connecting the two collectors will lie parallel to the plane of the arriving wave front, or, conversely, perpendicular to the direction of propagation or travel of the wave.

Still another object of my invention is to provide a radio direction finder system suitable for installation ashore, on surface vessels, or on aircraft which direction finder will be capable of determining accurately the direction of arrival of radio waves of any of the frequencies used in radio communication.

Figure 1:
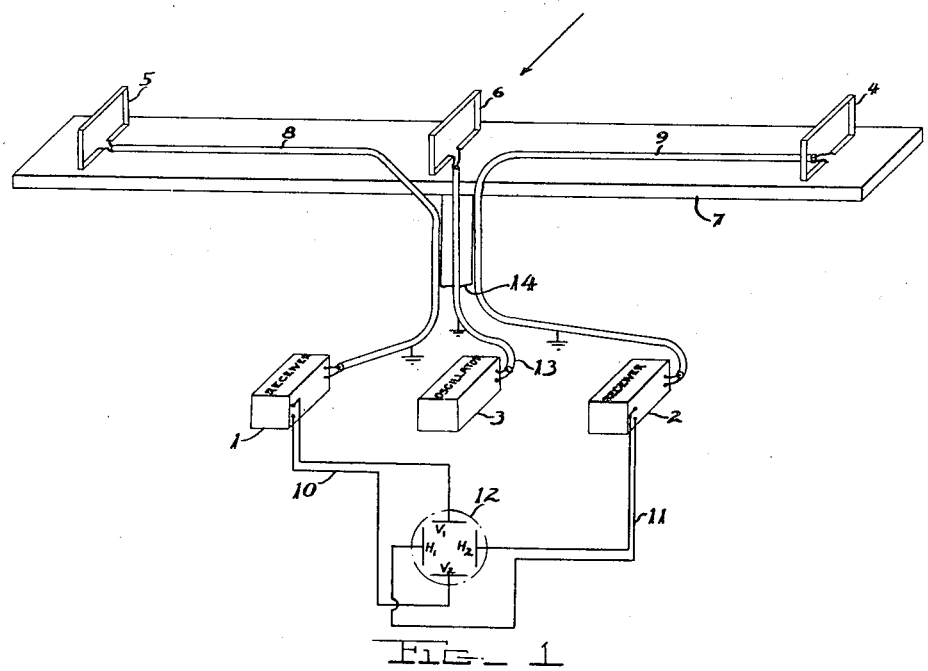
Figure 2:
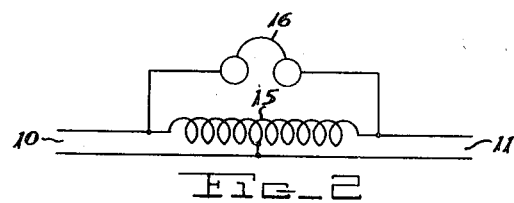
Figure 3:
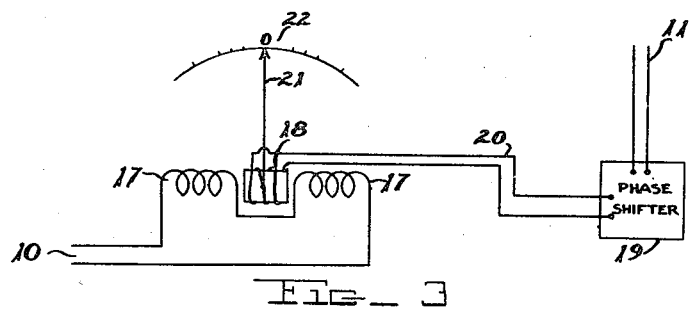

Other and further objects of my invention will be understood from the following specification and by reference to the accompanying drawings in which:

Fig. 1 diagrammatically illustrates a fundamental circuit arrangement of my invention;

Figs. 2 and 3 show alternative phase-difference indicating means.

In my invention the reasons for using two loop type receiving antennas and two receivers are deeply involved in the theory of wave propagation. That the advantages, of using two loop-type receiving antennas in the manner of my invention, would not be immediately apparent to anyone skilled in the art is indicated by the fact that such usage has not been resorted to previously, and is further indicated by the following intricate reasoning which led to the conception of the invention.

In the method usually applied to direction finding at low frequencies, in which frequency region the lines of electric stress (electric vectors) are almost invariably vertical and travelling horizontally, a single vertical loop antenna is oriented to the azimuth wherein the output voltage of the loop is zero, or as it is called, to a null point. This null point is reached when the plane of the loop lies in the plane of the wave front and results from the fact that the voltages induced between the lower and upper extremities of each vertical limb of the loop are equal in amplitude and phase and the resultant voltage around the loop is zero. When this principle of direction finding is applied to the higher frequency regions wherein the electric vectors are seldom vertical and seldom travel horizontally, a null point cannot be obtained from a vertical loop because the wave will contain component vectors that are horizontal, normal to the path of propagation, and travelling vertically. These vectors will induce maximum voltages in the horizontal limbs of a loop oriented for a normal null point. In the same wave there will be thrust vectors also horizontal and travelling vertically but lying parallel to the direction of propagation. These will induce no voltage in the loop because they do not lie parallel to any limb of a loop oriented for a normal null point.

Further study of the problem indicates that if the loop were used as a maximum signal indicator rather than as a null signal indicator this would require a 90-degree change of azimuth and the horizontal down-travelling component would no longer induce voltages in the loop. The thrust component would now induce voltages in the horizontal limbs of the loop and the vertical electrical vectors would induce voltages in the vertical limbs of the loop, but each would produce a maximum resultant loop output voltage when the plane of the loop paralleled the direction of propagation of the wave. Using the loop in this manner as a maximum signal indicator results in a tremendous loss of directional sensitivity because the rate of change of loop output voltage per degree of rotation in azimuth is now zero at the point of maximum signal whereas the rate of change of signal at the null point, in the absence of horizontal electric vectors, is very large. As a means for overcoming this lack of directional sensitivity, I place another loop parallel to the first but separated therefrom by a considerable distance. If now, these two loops are oriented as a unit until their mutually parallel planes are parallel to the direction of propagation of the wave, then the resultant output voltages of each loop will be not only equal in phase and amplitude, because each loop is acted upon by equal and in-phase vectors, but also the directional sensitivity will be excellent because a slight re-orientation of the system will cause one loop to intersect the electric vectors at a considerable time interval ahead of the other loop thus producing a maximum rate of change of phase per degree of rotation of the system.

The next step would seem to indicate the desirability of connecting the outputs of the two loops together in phase opposition so that the resultant voltage would be zero when the outputs of the loops were in phase and so that the system could be used as a null type direction finder. This plan, however, is not satisfactory for the reason that any inequalities of the impedances of the loop circuits will produce unequal phase shifts of the currents flowing therein and thus obliterate the desired null. My invention overcomes this undesirable feature by the use of a radiating member situated midway between the two loops and by the use of two receivers and a cathode ray oscilloscope for indicating directly the phase difference between the voltages induced in the two receiving loops rather than by means of connecting the outputs of the loops in phase opposition which is an indirect manner of indicating the phase difference of the loop voltages.

The manner in which the central radiator, the two receivers, and the phase-relation indicator operate to overcome the undesired phase shifts caused by the impedances of the loops is fully explained hereinafter.

Fig. 1 shows one embodiment of my invention wherein the loop antenna 4 and the loop antenna 5 are mounted on a supporting member 7 and spaced equidistant from the loop 6 which is likewise mounted on the supporting member 7. The planes of loop 4, loop 5 and loop 6 are vertical and mutually parallel. Loop 5 is connected by means of a transmission line 8 to the radio receiver 1 and loop 4 is connected by means of a transmission line 9 to the radio receiver 2. The transmission lines are preferably of the concentric type as shown but any type of well shielded transmission line will serve the desired purpose. The circuits of receiver 1 and of receiver 2 are not shown for the reason that any type of radio receiver capable of receiving a modulated radio frequency signal and capable of delivering at its output terminals the detected audio frequency component thereof will serve the desired purpose and such receiver circuits are well known to the radio art. The audio frequency amplifier circuits of receiver 1 and of receiver 2 should be matched, that is, a signal of any audio frequency should encounter equal phase shifts in transversing each audio frequency amplifier. This requirement may be fulfilled by means well known to the radio art.

The audio output of receiver 1 is connected by means of the two wire line 10 to the vertical deflection plates V1 and V2 of the cathode ray oscilloscope 12. The audio output of receiver 2 is connected by means of the two wire line 11 to the horizontal deflection plates H1 and H2 of the cathode ray tube 12. The power supply circuits for the cathode ray tube 12 are not shown for the reason that any type of cathode ray tube having the usual vertical and horizontal deflection plates will serve the desired purpose and such cathode ray tubes and power supply circuits are well known to the radio art.

The loop 6 is connected by means of the transmission line 13 to the output of radio frequency oscillator 3. The circuits of radio frequency oscillator 3 are not shown for the reason that any type of radio frequency oscillator capable of delivering a constant and controllable radio frequency output will serve the desired purpose and such oscillator circuits are well known to the radio art.

The supporting member 7 may be a turn-table rotatable about the vertical shaft 14 or it may be the wing of an airplane in which the rotative movement is obtained by changing the direction of flight of the airplane.

The mode of operation of my invention is as follows: The arrow in Fig. 1 represents the direction of propagation of a received radio wave which is, in this case, taken to be parallel to the planes of the three loops 4, 5 and 6 but not necessarily horizontal and not necessarily normally polarized.

The arriving wave will induce, in the four limbs of each loop, voltages having amplitudes and phases dependent on the polarization of the wave, on the angle between its direction of propagation and the planes of the loops, on its angle of incidence above the horizontal, and on its field intensity. However, if the same radiation field links all of the loops, the vector sum of all of the voltages induced in each loop will be equal in amplitude and in phase. In order for these voltages to reach the grids of the final detectors of receivers 1 and 2 without acquiring a relative phase difference, it would be necessary for the impedances of loops 4 and 5 to be identical, for the propagation constants of transmission lines 8 and 9 to be identical and for the receivers 1 and 2 to be identically tuned and to have identical tuning characteristics.

These requirements may be fulfilled in practice only with the greatest difficulty and to obviate the necessity for their fulfillment, my invention also provides the oscillator 3 hereinafter called the phasing oscillator, which transmits radio frequency energy of any desired frequency to the transmission line 13 and thence to the loop 6. The loop 6 is equidistant from the loops 4 and 5 and consequently induces in them, voltages which are equal and in phase. The voltages induced in loops 4 and 5 by loop 6 will hereinafter be called the local signal and the voltages induced in loops 4 and 5 by the wave arriving from a distant station will hereinafter be called the distant signal.

In the preferred mode of operation of my invention, the frequency of the phasing oscillator 3 is adjusted to produce a local signal frequency differing from the frequency of the distant signal by approximately 1000 cycles or any other convenient audio frequency.

Of the two signals reaching the grid of the last detector of receiver 1, the one produced by the distant signal may be expressed as $E_d = \sin(\omega t + \phi_1 + \alpha)$ where $\omega = 2\pi f_d$, where $f_d$ = frequency of the distant signal, where $\phi_1$ = the lead or lag in phase between the distant signal voltage induced in loop 5 and the voltage reaching the grid of the last detector which lead or lag is caused by the impedances of the intervening circuits, and where $\alpha$ = the lead or lag in phase between the voltages induced in loops 4 and 5 by the distant signal. In the case so far presented, $\alpha$ has been taken to be zero.

Of the two signals reaching the grid of the last detector of receiver 1, the one produced by the local signal may be expressed as $E_1 = \sin(\rho t + \phi_2 + \beta)$ where $\rho = 2\pi f_1$, where $f_1$ = frequency of the local signal, where $\phi_2$ = the lead or lag in phase between the local signal voltage induced in loop 5 and the voltage reaching the grid of the last detector which lead or lag is caused by the intervening circuits, and where $\beta$ = the lead or lag in phase between the voltages induced in loops 4 and 5 by the local signal.

The only audio frequency component of the output of the last detector of receiver 1 will then be proportional to $E_1 = \cos(\omega t - \rho t + \phi_1 - \phi_2 + \alpha - \beta)$.

The phase angle $\beta$ is always zero because loop 6 is always equi-distant from loops 4 and 5. The phase angle $\phi_1$ differs from the phase angle $\phi_2$ by a negligible amount because the frequencies of the local and distant signals differ by such a very small percentage of the frequency of either. Taking $\phi_1-\phi_2=0$ and $\beta=0$, the output of the last detector of receiver 1 will be proportional to $E_1=\mathrm{Cos}\,(\omega t-pt=\alpha)$.

In like manner, it can be shown that the only audio frequency component of the output of the last detector of receiver 2 will be proportional to $E_2=\mathrm{Cos}\,(\omega t-pt)$. The induced voltage of loop 4 was taken as reference phase so that the angle $\alpha$ does not appear in the above expression.

It is now seen that the only audio components of the outputs of the last detectors of receivers 1 and 2 are voltages having identical audio frequencies and differing in phase by the angle $\alpha$ which is a function only of the phase difference of the voltages induced in loops 4 and 5 by the distant signal and not a function of the impedances of loops, transmission lines or receivers.

If the audio amplifiers of the two receivers are adjusted or matched by means well known to the art so that the lead or lag of phase acquired by any audio frequency signal transversing one of them will be identical to the lead or lag of phase acquired by a signal of the same frequency transversing the other, then the audio output of each receiver, and therefore the audio signals applied to the vertical and horizontal deflection plates of the cathode ray tube 12, will differ in phase by only the angle $\alpha$ which is a function solely of the phase difference of the voltages induced in loops 4 and 5 by the distant signal.

In accordance with the well known theory of operation of the cathode ray tube, equal and in-phase voltages applied to the vertical and horizontal deflection plates will produce a straight line cathode ray trace which is inclined at 45 degrees to the planes of each pair of deflecting plates. Should the voltages be unequal, the trace will remain a straight line but its angle of inclination will be modified. Of greatest importance, however, is the fact that should the two voltages differ in phase, the cathode ray trace will become an ellipse. This application of the cathode ray tube makes possible the detection of phase differences as small as one degree between the output voltages of receiver 1 and receiver 2 or, as has been demonstrated, makes possible the detection of phase differences as small as one degree between the voltages induced by the distant signal in loops 4 and 5.

When the supporting member 7 is oriented so that the planes of the loops are parallel to the direction of propagation of the arriving wave, the phase difference $\alpha$ between the voltages induced in loops 4 and 5 will be zero, as has been demonstrated previously, and the cathode ray trace will be a straight line. For any other orientation of the supporting member 7, the phase difference between the voltages induced in loops 4 and 5 will be $$\alpha=2\pi\cdot\frac{D}{\lambda}$$

Sin Z.Cos $\theta$ where D=distance in meters between loop 4 and loop 5, where $\lambda$=wave length of distant signal, where Z=bearing of the planes of the loops relative to direction of propagation of the wave, and where $\phi$=angle of incidence of the wave with the horizontal.

The angle $\alpha$ may be accurately determined from the dimensions of the ellipse viewed on the screen of the cathode ray tube. The lengths D and $\lambda$ may be measured accurately but from these factors the bearing Z cannot be determined unless the indeterminate and varying angle of incidence $\phi$ is known or unless $\alpha$=zero when Z must equal zero regardless of the value of $\phi$ unless $\phi$ be 90° which is a condition seldom if ever encountered in practice. Therefore my invention requires that the parallel planes of the loops must be rotated until the cathode ray trace becomes a straight line when $\alpha$ will equal zero and then Z will be zero regardless of the angle of incidence of the received waves and therefore the parallel planes of the loops will lie in the plane of propagation of the wave. My invention does not consider using loops in arbitrary or fixed planes and thus determining Z from the observed value of $\alpha$ because the results so obtained would be accurate only when $\phi$=zero which seldom occurs in long distance high frequency wave propagation.

It is not desired to restrict the loops to single turn loops as shown in Fig. 1. The number of turns used and the size of each loop will depend upon the frequency range to be covered and will be determined by methods well known to the art. Nor are the loops necessarily untuned as shown in Fig. 1. They may be tuned by placing variable capacitors in shunt to or in series with their output terminals in a manner well known to the art. It has been herein demonstrated that tuning or lack of tuning cannot adversely affect the direction finder. The antenna 6 need not be of the loop type, since a short vertical radiator may be used satisfactorily.

The loops shown in Fig. 1 are unbalanced because they are connected to concentric type transmission lines having grounded outer conductors. This is the preferable embodiment of my invention for the reason that concentric type transmission lines are less susceptible to the effects of radiation fields surrounding them and because unbalanced loops in no way adversely effect the direction finder, to the contrary, unbalanced loops are preferable because of their greater effective height. It is not desired to restrict the transmission lines to concentric types nor require that the loops be unbalanced. Other types of transmission lines and balanced loops may be used successfully.

Receivers 1 and 2 may be either the superheterodyne type or the tuned radio frequency type.

As shown in Fig. 2, the cathode ray oscilloscope may be replaced by a center-tapped auto-transformer 15 across the outside terminals of which there is connected a pair of telephones 16. When the audio signal arriving from receiver 1 via the 2-wire line 10 is of equal amplitude and phase to the audio signal arriving from receiver 2 via the 2-wire line 11, the telephone signal will be zero or may be said to pass through a null point. This substitution for the cathode ray tube requires that the amplitudes of the output signals of both receivers be identical. This may be accomplished by the use of any one of many types of automatic volume controls well known to the radio art and suitable for application to the type of receiver used.

As shown in Fig. 3, the cathode ray tube may be replaced by a zero-center dynamometer type electrical indicating instrument consisting of fixed coils 17, rotor coil 18, pointer 21 and scale 22. The output of receiver 1 is connected through the two wire line 10 to the coils 17 while the output of receiver 2 is connected through the two-wire line 11, through the phase shifting device 19, through the two-wire line 20 to the rotor coil 18. The phase shifting device 19 may be any one of several types, well known to the art, which are capable of producing a 90-degree change of phase between the input and output voltages over a wide range of audio frequencies. Under these conditions, when the receiver output signals are in phase, the magnetic fields of coils 17 and 18 will be 90 degrees out of phase and will produce no torque tending to rotate coil 18 or pointer 21. However, whenever the receiver output signals are not in phase, there will exist in-phase components of magnetic fields linking coils 17 and 18 which will product a torque tending to move pointer 21 either clockwise or counter-clockwise depending on which receiver output leads the other output in phase. This combination, like the cathode ray tube does not require that the output signals of the two receivers be equal in amplitude, and it offers a certain advantage over the cathode ray tube in that the direction of off bearing signals is properly indicated as being to the right or left.

It is obvious that the tuning devices of the oscillator and of both receivers may be ganged.

The invention herein described and claimed may be used and/or manufactured by or for the Government of the United States of America for governmental purposes without the payment of any royalties thereon or therefor.

I claim:

1. Apparatus as described, comprising a pair of radio wave collector loops laterally spaced apart, and unconnected to each other, a third loop equi-distant from the loops of said pair, all of said loops being mutually parallel, a rotatable member upon which all of said loops are fixed, an oscillator connected to supply energy to said third loop to be radiated therefrom, the frequency of the energy from said oscillator differing from that of the energy from a distant source received by said collector loops by a value within the audio range, an amplifying receiver connected to each of the loops of said pair, and a cathode ray oscilloscope having its vertical deflection plates connected to the audio output leads of one of said receivers and its horizontal deflection plates connected to the audio output leads of the other of said receivers, whereby to indicate the phase relation between the outputs of the two receivers.

2. Apparatus as described, comprising a pair of radio wave collector loops laterally spaced apart and unconnected to each other, a third loop equi-distant from the loops of said pair, all of said loops being mutually parallel, a rotatable member upon which all of said loops are fixed, an oscillator connected to supply energy to said third loop to be radiated therefrom, the frequency of the energy from said oscillator differing from that of the energy from a distant source received by said collector loops by a value within the audio range, an amplifying receiver connected to each of the loops of said pair, an inductance having one terminal connected to one output lead of one of said receivers and its other terminal connected to the corresponding output lead of the other receiver, the other output leads of said receivers being connected to a center tap on said inductance, and a telephone connected across the terminals of said inductance, whereby phase relation between said outputs may be detected aurally.

3. Apparatus as described, comprising a pair of radio wave collector loops laterally spaced apart and unconnected to each other, a third loop equidistant from the loops of said pair, all of said loops being mutually parallel, a rotatable member upon which all of said loops are fixed, an oscillator connected to supply energy to said third loop to be radiated therefrom, the frequency of the energy from said oscillator differing from that of the energy from a distant source received by said collector loops by a value within the audio range, an amplifying receiver connected to each of the loops of said pair, a phase shifter connected to the output leads of one of said receivers to shift the phase of that output ninety degrees, and a zero centered dynamometer-type electrical indicating instrument having one coil connected to said phase shifter and a coil to react with the aforesaid coil connected to the output leads of the other of said receivers, whereby said instrument will indicate the phase relation between the outputs of said receivers.

4. Apparatus as described, comprising a pair of radio wave collector loops laterally spaced apart and unconnected to each other, a third loop equidistant from the loops of said pair, all of said loops being mutually parallel, a rotatable member upon which all of said loops are fixed, an oscillator connected to supply energy to said third loop to be radiated therefrom, the frequency of the energy from said oscillator differing from that of the energy from a distant source received by said collector loops by a value within the audio range, an amplifying receiver connected to each of the loops of said pair, and means connected to the output leads of both of said receivers to cause the energy derived therefrom to interact to indicate the phase relation between the said two outputs.

EDWARD N. DINGLEY, Jr.

REFERENCES CITED

The following references are of record in the file of this patent:

UNITED STATES PATENTS

| Number | Name | Date |
| --- | --- | --- |
| 984,108 | Roos | Feb. 14, 1911 |
| 1,739,520 | Potter | Dec. 17, 1929 |
| 1,839,290 | Bailey | Jan. 5, 1932 |
| 1,968,068 | Blancard et al. | July 31, 1934 |
| 2,005,962 | Antranikian | June 25, 1935 |
| 2,061,737 | Offenhauser | Nov. 24, 1936 |
| 2,083,495 | Black et al. | June 8, 1937 |
| 2,226,379 | Kummich et al. | Dec. 24, 1940 |
| 2,361,436 | Taylor | Oct. 31, 1944 |
| 2,423,437 | Budenbom | July 8, 1947 |

OTHER REFERENCES

Proceedings of the IRE, May 1928, 250–11.2, vol. 16, No. 5, Pgs. 658–665 (Copy in Div. 51).